US008040340B2

(12) United States Patent
Chuang et al.

(10) Patent No.: US 8,040,340 B2
(45) **Date of Patent: *Oct. 18, 2011**

(54) CONTROL CIRCUIT HAVING A COMPARATOR FOR A BANDGAP CIRCUIT

(75) Inventors: Kai-Lan Chuang, Tainan (TW); Guo-Ming Lee, Tainan (TW)

(73) Assignee: Himax Technologies Limited, Tainan County (TW)

( * ) Notice: Subject to any disclaimer, the term of this patent is extended or adjusted under 35 U.S.C. 154(b) by 754 days.

This patent is subject to a terminal disclaimer.

(21) Appl. No.: 11/982,884

(22) Filed: Nov. 5, 2007

(65) Prior Publication Data

US 2009/0115774 A1 May 7, 2009

(51) Int. Cl.
*G06F 3/038* (2006.01)
*G09G 5/00* (2006.01)

(52) U.S. Cl. ........................................................ 345/211

(58) Field of Classification Search .......... 345/211–213; 323/313, 314; 327/539; 365/72
See application file for complete search history.

(56) References Cited

U.S. PATENT DOCUMENTS

| | | | | |
|---|---|---|---|---|
| 5,686,823 | A * | 11/1997 | Rapp | 323/313 |
| 6,232,757 | B1 * | 5/2001 | Afghahi et al. | 323/314 |
| 2007/0210856 | A1 * | 9/2007 | Uehara | 327/539 |
| 2009/0219746 | A1 * | 9/2009 | Bosmuller et al. | 365/72 |

FOREIGN PATENT DOCUMENTS

WO WO 20007118679 A1 * 10/2007

* cited by examiner

*Primary Examiner* — Chanh Nguyen
*Assistant Examiner* — Sanghyuk Park
(74) *Attorney, Agent, or Firm* — Stout, Uxa, Buyan & Mullins, LLP

(57) ABSTRACT

A control circuit for a start-up circuit that induces current flow in a bandgap circuit during a start-up phase is disclosed. A comparator passes a power supply to the start-up circuit according to an internal node of the bandgap circuit after the start-up phase. An activating circuit is used to activate the comparator to obtain the power supply at an output earlier than another output node of the comparator.

14 Claims, 4 Drawing Sheets

CONTROL CIRCUIT HAVING A COMPARATOR FOR A BANDGAP CIRCUIT

BACKGROUND OF THE INVENTION

1. Field of the Invention

The present invention generally relates to a bandgap circuit, and more particularly to an auxiliary control circuit for the bandgap circuit.

2. Description of Related Art

A voltage reference is an electronic circuit that generates a fixed voltage regardless of the loading on the circuit. A bandgap circuit is one of the voltage reference circuits for generating a fixed reference voltage that has a value equal to the electron bandgap level of silicon (approximate 1.2 volts) and changes very little with temperature. The bandgap circuits are widely used in electronic systems. FIG. 1, for example, shows a bandgap circuit 101 used in the source driver 10 for a liquid crystal display (LCD) panel 12. A mirror circuit 103 mirrors the current in the bandgap circuit 101. The bandgap circuit 101 and the mirror circuit 103 constitute portion of the power circuit 100 of the source driver 10. The output of the mirror circuit 103 is fed to buffers of driving channels 102. It is well known that a self-biased circuit such as the bandgap circuit 101 shown here, during a start-up phase, has an undesirable zero-bias state in which zero current flows in the circuit. In order to obviate this problem, a start-up circuit 105 is thus needed.

An ideal start-up circuit should not affect the bandgap circuit 101. In other words, the start-up circuit should be inactivated, and the current through the start-up circuit should become zero or very small during normal operation (or after start-up phase). It is, however, unfortunately found that most of the conventional start-up circuits 105 did affect the bandgap circuit 101. Specifically, after the positive power supply VDDA has reached a specified level and during the normal operation, the component or components in the start-up circuit 105 are not completely close or shut down as required. As these components are leaky, they cause unwanted increase in current in the bandgap circuit 101. Worst of all, the output currents of the mirror circuit 103 would increase abruptly under a positive power supply VDDA greater than a specified value. Such an increased current disadvantageously incurs higher consumed power, and at the worst, the functions of circuit stage receiving the output currents would consequently fail.

For the foregoing reason, a need has arisen to propose a scheme to control the start-up circuit 105 such that the start-up circuit 105 does not affect the bandgap circuit 101 during the normal operation.

SUMMARY OF THE INVENTION

In view of the foregoing, it is an object of the present invention to provide a control circuit operated to prevent the effect on the bandgap circuit and the following current source during the normal operation.

According to one embodiment, the present invention provides a circuit for starting up a bandgap circuit. A start-up circuit induces current flow in the bandgap circuit during a start-up phase. Subsequently, a comparator is configured to pass a power supply to the start-up circuit according to an internal node of the bandgap circuit after the start-up phase; and an activating circuit is used to activate the comparator to obtain the power supply at an output earlier than another output node of the comparator.

DETAILED DESCRIPTION OF THE INVENTION

Figure 1:
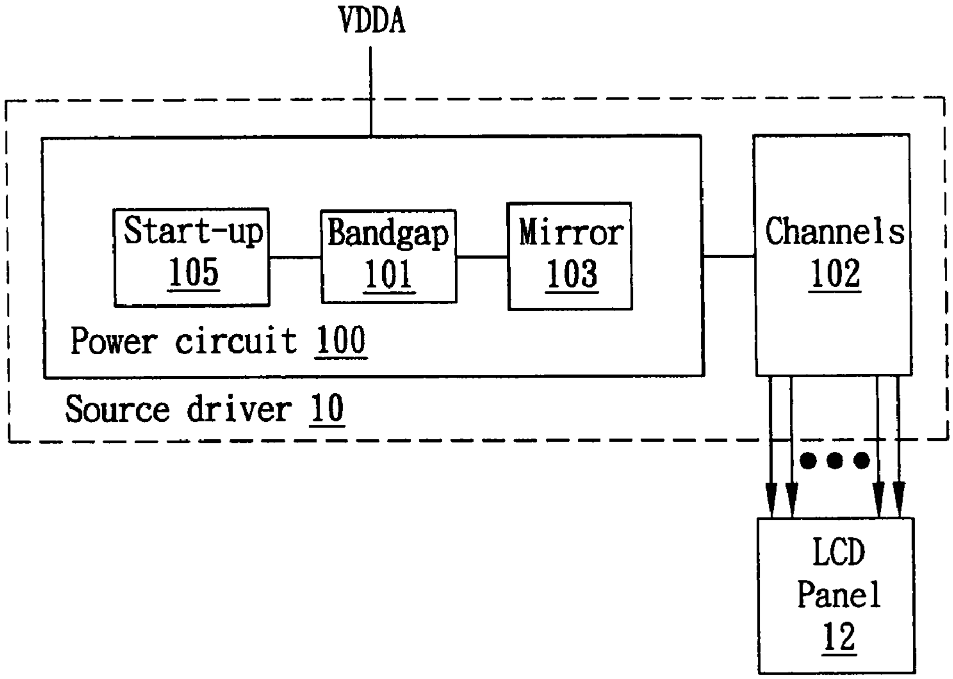
FIG. 1(Prior Art)
FIG. 1 shows a conventional start-up circuit and a bandgap circuit used in the source driver for an LCD panel.
Figure 2A:
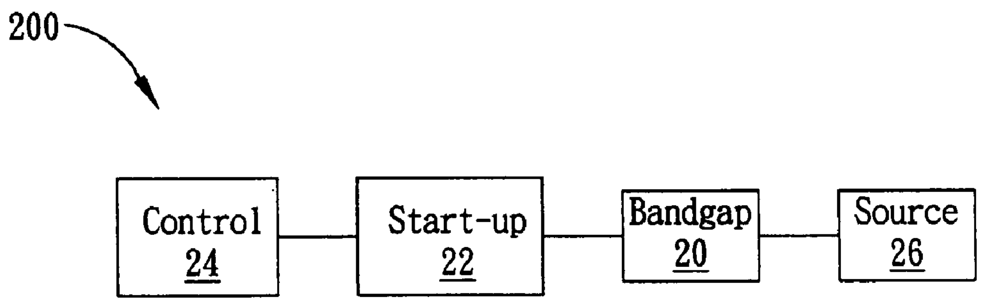
FIG. 2A illustrates a functional block diagram according to one embodiment of the present invention.

FIG. 2A illustrates a functional block diagram of a power circuit 200 according to one embodiment of the present invention. A bandgap circuit 20 generates a fixed reference voltage that changes very little with temperature. A start-up circuit 22 induces current flow into internal node(s) of the bandgap circuit 20 during the start-up phase, so that undesirable zero-bias state in the bandgap circuit 20 could be obviated. After the start-up phase, as a positive power supply has reached a specified level to enter the normal operation phase, an auxiliary control circuit 24 operates to close or shut down the start-up circuit 22, such that the start-up circuit 22 is not leaky anymore, and no longer causes unwanted increase in current in the bandgap circuit 20. Furthermore, a source 26, such as a current source that generates current(s) in accordance with the bandgap circuit 20 would not increase its current output abruptly under the power supply being greater than a specified value. In the exemplary embodiment, the bandgap circuit 20 is utilized to generate reference signal in a source driver, which further drives a liquid crystal display (LCD) panel (not shown).

Figure 2B:
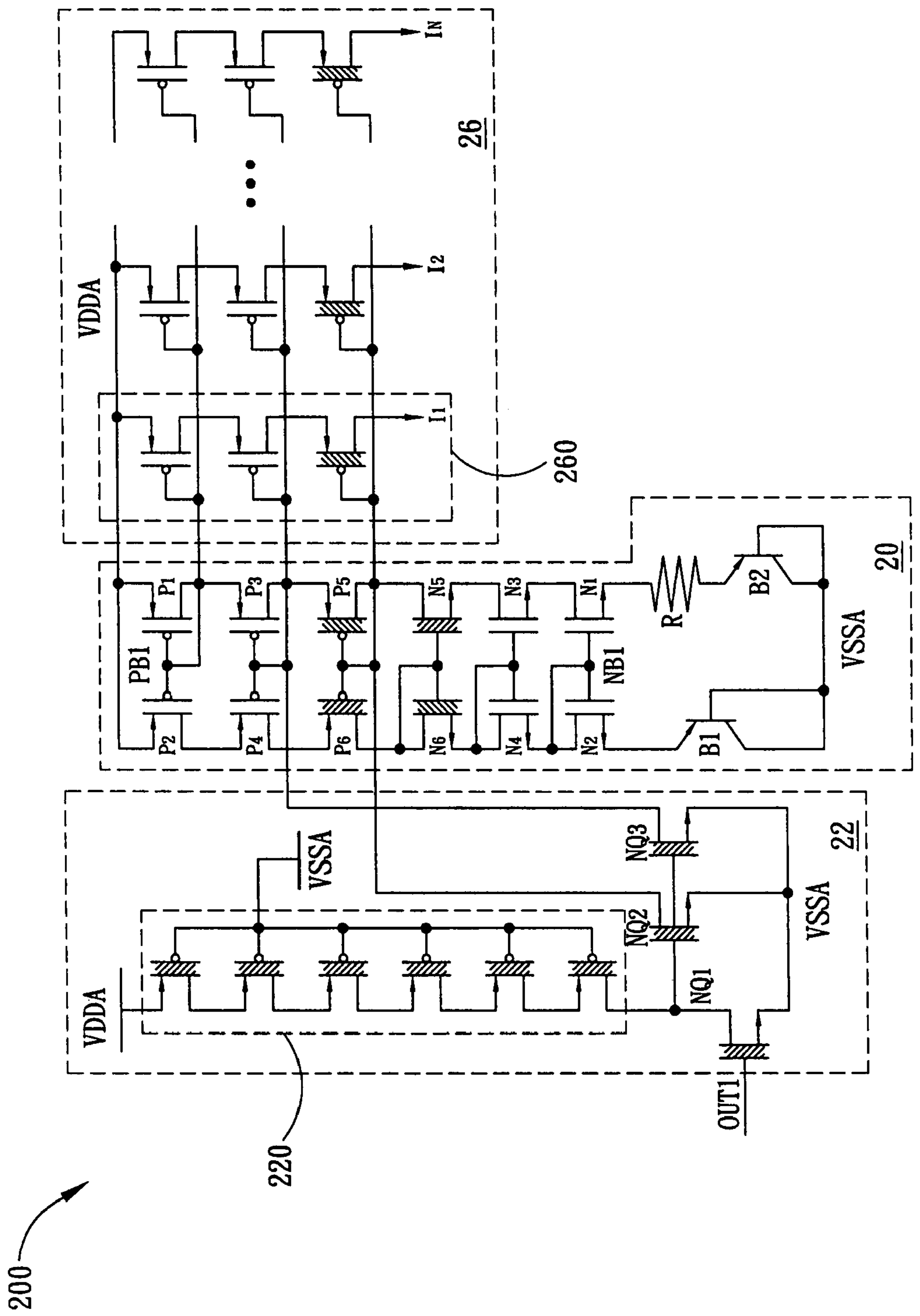
FIGS. 2B-2C show an exemplary circuit diagram according to the embodiment of the present invention.
Figure 2C:
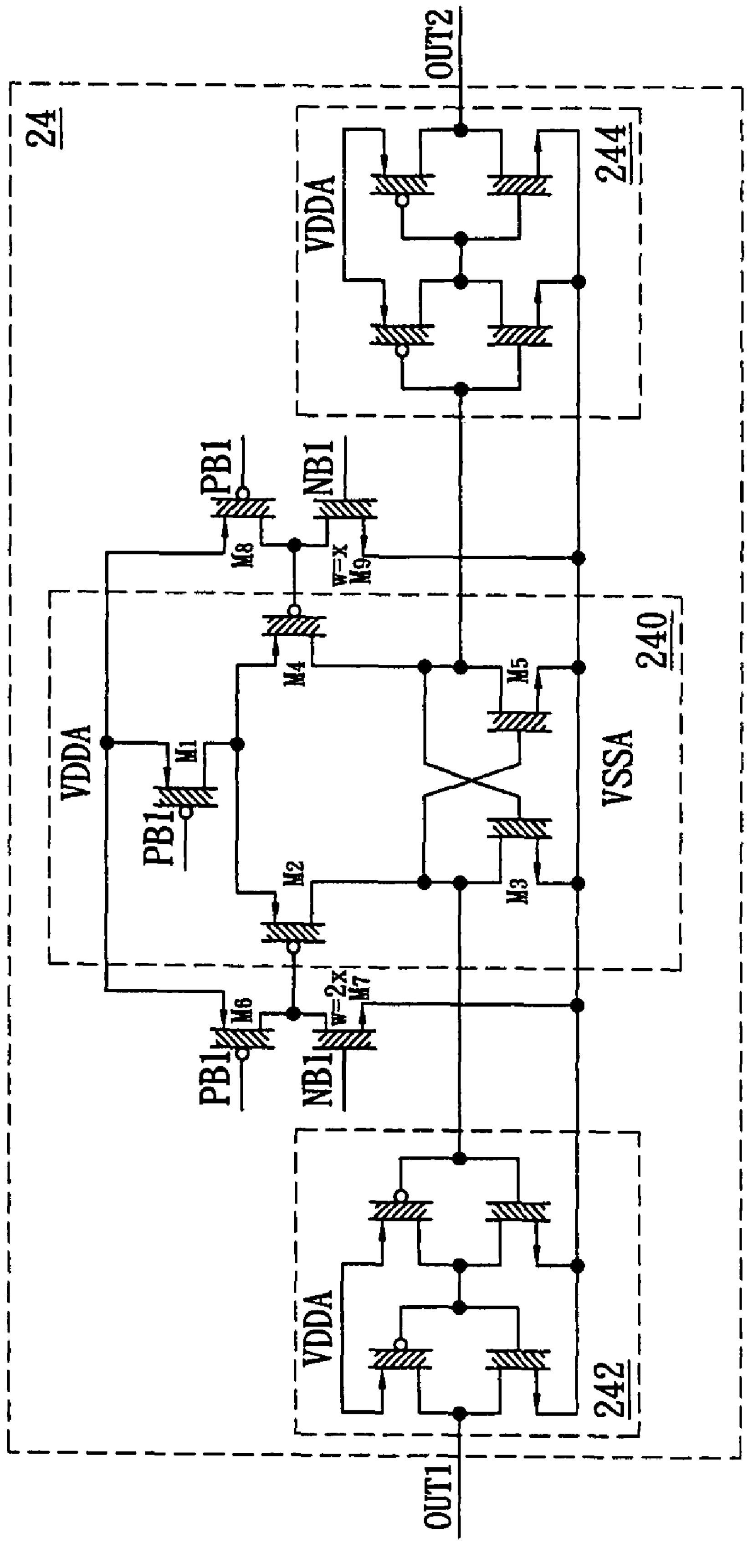

FIGS. 2B-2C show an exemplary circuit diagram of the power circuit 200 according to the embodiment of the present invention. In the embodiment, the bandgap circuit 20 is illustrated, but not as limitation, for providing reference signal to the current source 26 in the source driver for the LCD panel. It is, however, appreciated by those skilled in the pertinent art that the structure and the application of the bandgap circuit 20 are not limited to the exemplary embodiment. The building block of the bandgap circuit 20 primarily includes a diode-connected PMOS (p-type metal-oxide-semiconductor) P1, a PMOS P2, an NMOS (n-type metal-oxide-semiconductor) N1, and a diode-connected NMOS N2. Further, a diode-connected bipolar PNP transistor B1 is connected to the source of the NMOS N2 in the P2-N2 branch; and serial-connected resistor R and diode-connected bipolar PNP transistor B2 are connected to the source of the NMOS N1 in the P1-N1 branch. In the embodiment, the gates of the PMOS P1 and PMOS P2 are directed connected at a first node PB1; the gates of the NMOS N1 and NMOS N2 are directed connected at a second node NB1; the drain of the PMOS P1 and the drain of the NMOS N1 are electrically coupled in serial via other components; and the drain of the PMOS P2 and the drain of the NMOS N2 are electrically coupled in serial via other components. Based on the building block discussed above, same currents flow through the PNP transistor B1 and the resistor R, respectively. Accordingly, the resistor R gives a proportional-to-absolute-temperature (PTAT) voltage drop that increases with temperature, and the PNP transistor B2 gives a complementary-to-absolute-temperature (CTAT) voltage drop that decreases with temperature. The PTAT voltage drop and the CTAT voltage drop together form the bandgap circuit 20 that changes very little with temperature.

In the embodiment, in addition to the building block, the bandgap circuit 20 includes further PMOSs P5, P6 and NMOSs N5, N6 that are cascoded to the building block discussed above. In the figure, the schematic PMOS/NMOS symbol with oblique lines represent a high-voltage PMOS/NMOS that is manufactured for operation in a voltage higher than, for example, ten or more volts, while the schematic PMOS/NMOS symbol without oblique lines represent a low-voltage PMOS/NMOS that is manufactured for operation in a lower voltage.

Still referring to FIGS. 2B-2C, in the embodiment, the source circuit 26 is a mirror circuit that mirrors the reference current in the bandgap circuit 20 to output a number of currents $I_1$-$I_N$. In the exemplary embodiment, each column of the mirror circuit 26 constitutes an individual current mirror. The gate of each PMOS, for example, of the first current mirror 260, is directly connected to the gate of the corresponding PMOS of the bandgap circuit 20, and therefore the reference current in the bandgap circuit 20 is mirrored by the current mirror 260.

As discussed before, it is well known that the bandgap circuit 20 probably possesses an undesirable zero-bias state in which zero current flows in the circuit during a start-up phase. In order to obviate this problem, a start-up circuit 22 is thus needed, and is connected to the bandgap circuit 20. In the embodiment, the start-up circuit 22 primarily includes a resistive load 220 and NMOSs NQ1, NQ2, and NQ3 connected as shown. The resistive load 220 includes serial-connected PMOSs with their gates connected together and biased by a base power supply VSSA. The drain of the NMOS NQ1 is connected to the resistive load 220, and to the gates of the NMOSs NQ2 and NQ3. Although two NMOSs (NQ2 and NQ3) are used in the embodiment, it is however appreciated by those skilled in the pertinent art that less than or more than two NMOSs could be used instead. The outputs of the start-up circuit 22, i.e., the drains of the NMOSs NQ2 and NQ3, are respectively connected to the gates of the PMOSs of the bandgap circuit 20. During the start-up phase, the increasing power supply VDDA controls to activate the gates of the NMOSs NQ2 and NQ3 through the resistive load 220. Subsequently, the drains of the activated NMOSs NQ2 and NQ3 supply base power supply VSSA to the gates of the PMOSs of the bandgap circuit 20, and thus make current flowing in the bandgap circuit 20. It is appreciated by those skilled in the pertinent art that the NMOSs (NQ2 and NQ3) could be replaced by PMOSs such that the positive power supply VDDA is supplied to the gates of the NMOSs of the bandgap circuit 20 to make current flowing in the bandgap circuit 20. In ideal situation, after the start-up phase (that is, as the power supply VDDA has reached a specified level to enter the normal operation), the NMOS NQ2 and NQ3 become close, and no current is consumed therein. However, conventional start-up circuit is not completely shut down, therefore causing unwanted increase in current in the bandgap circuit 20 and the mirror circuit 26. An auxiliary control circuit 24 is thus required in the embodiment to overcome this situation.

In the embodiment, the control circuit 24 primarily includes a comparator 240 that includes, among others, a PMOS M1 whose gate is controlled under the voltage at an internal node, such as the node PB1, of the bandgap circuit 20. The source of the PMOS M1 receives the positive power supply VDDA, and the drain of the PMOS M1 is connected to a branch having serial-connected PMOS M2 and NMOS M3, and also connected to another branch having serial-connected PMOS M4 and NMOS M5. The drain of the NMOS M3 and the drain of the NMOS M5 are cross-connected to each other's gate. Ahead of one input of the comparator 240 (or the gate of the PMOS M2) is a serial-connected PMOS M6 and NMOS M7 having output connected to the input of the comparator 240, and having inputs respectively controlled under the nodes PB1 and NB1 of the bandgap circuit 20. Ahead another input of the comparator 240 is another serial-connected PMOS M8 and NMOS M9. It is particularly noted that the width (e.g., w=2x) of the NMOS M7 is greater than the width (e.g., w=x) of the counterpart NMOS M9. Accordingly, the branch of the M2-M3 obtains the power supply VDDA at an output node earlier than another branch of the M4-M5. The control circuit 24 may additionally includes cascaded inverters 242 each having serial-connected PMOS and NMOS.

In operation, after the start-up phase (that is, as the power supply VDDA has reached a specified level to enter the normal operation), the voltage at the node PB1 reaches a specified low level and the voltage at the node NB1 reaches a specified high level, thereby activating the comparator 240 and allowing the power supply VDDA pass and activate the NMOS NQ1 of the start-up circuit 22 (directly or via the cascaded inverters 242). Specifically, the drain of the NMOS NQ1 is pulled down to the base power supply VSSA, and consequently makes the NMOSs NQ2 and NQ3 completely close. Therefore, the start-up circuit 22 is thus completely shut down without causing unwanted increase in current in the bandgap circuit 20 and the mirror circuit 26. In the embodiment, the power supply VDDA passes through, among others, the PMOS M1 with a delay time that makes sure the passed power supply VDDA at OUT1 does not prematurely shut down the start-up circuit 22. The cascaded inverters 242 are added in the embodiment to shape the waveform of passed power supply VDDA to reinforce the complete shutdown of the start-up circuit 22 after the start-up phase. Another cascaded inverters 244 are optionally added on the other side of the comparator 240 to make the whole circuit symmetrical and operate correctly as required.

Figure 3:
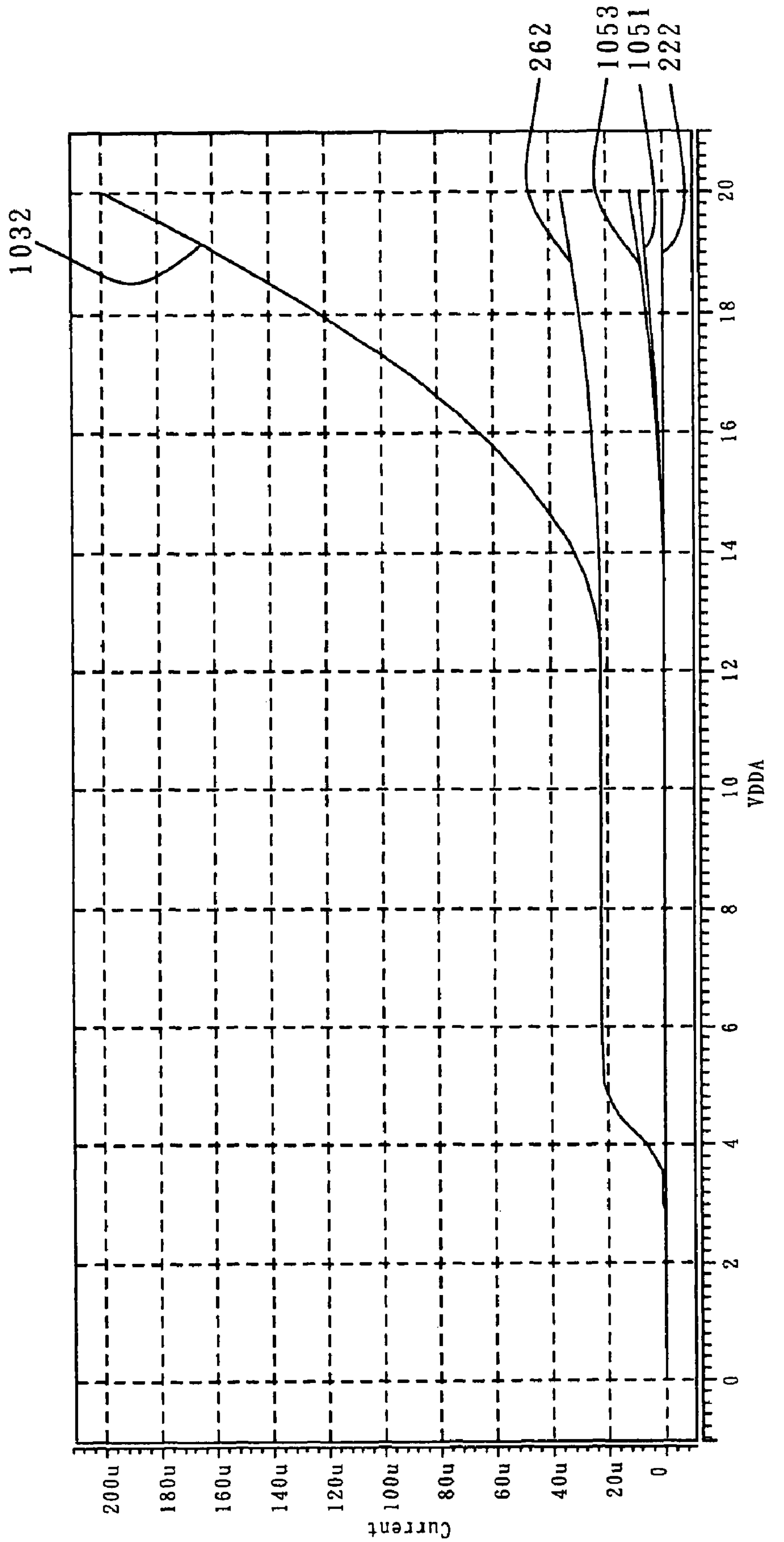
FIG. 3 illustrates the comparison between the embodiment and conventional counterpart regarding the output current against the power supply.

FIG. 3 illustrates the comparison between the embodiment and conventional counterpart regarding the output current (in ampere) of the mirror circuit 26 and the leaky currents through the NMOSs (NQ2 and NQ3) of the start-up circuit 22 against the power supply VDDA (in volt). It is apparent that the currents 222 through the NMOSs (NQ2 and NQ3) of the start-up circuit 22 are substantially constant with respect to increased power supply VDDA, while the leaky currents 1051 and 1053 in the conventional start-up circuit 105 nevertheless increase with the power supply VDDA. It is more noticeable that the output current 262 of the mirror circuit 26 is quite stable compared to the exponentially increasing output current 1032 of the conventional mirror circuit 103.

Although specific embodiments have been illustrated and described, it will be appreciated by those skilled in the art that various modifications may be made without departing from the scope of the present invention, which is intended to be limited solely by the appended claims.

What is claimed is:

1. A control circuit for a start-up circuit that induces current flow in a bandgap circuit during a start-up phase, comprising:

a comparator configured to pass a power supply to the start-up circuit according to an internal node of the bandgap circuit after the start-up phase, the comparator comprising:

a first PMOS transistor having a gate connected to a first node of the bandgap circuit, and a source connected to a positive power supply;

a first branch including serial-connected second PMOS transistor and third NMOS transistor, wherein a source of the second PMOS transistor is connected to a drain of the first PMOS transistor, and a source of the third NMOS transistor is connected to a base power supply; and a second branch including serial-connected fourth PMOS transistor and fifth NMOS transistor, wherein a source of the fourth PMOS transistor is connected to the drain of the first PMOS transistor, and a source of the fifth NMOS transistor is connected to the base power supply;

wherein a gate of the third NMOS transistor is connected to a drain of the fifth NMOS transistor, and a gate of the fifth NMOS transistor is connected, to a drain of the third NMOS transistor; and an activating circuit for activating the comparator to obtain the power supply at an, output earlier than another output node of the comparator, the activating circuit comprising:

a serial-connected sixth PMOS transistor and seventh NMOS transistor, an interconnected node between the sixth PMOS transistor and the seventh NMOS transistor being connected to a gate of the second PMOS transistor, wherein a gate of the sixth PMOS transistor is connected to the first node of the bandgap circuit, and a gate of the seventh NMOS transistor is connected to a second node of the bandgap circuit; and a serial-connected eighth PMOS transistor and ninth NMOS transistor, an interconnected node between the eighth PMOS transistor and the ninth NMOS transistor being connected to a gate of the fourth PMOS transistor, wherein a gate of the eighth PMOS transistor is connected to the first node of the bandgap circuit, and a gate of the ninth NMOS transistor is connected to the second node of the bandgap circuit;

wherein the first node of the bandgap circuit reaches a specified low-level voltage and the second node of the bandgap circuit reaches a specified high-level voltage higher than the low-level voltage after the start-up phase; and wherein the seventh NMOS transistor and the ninth NMOS transistor are asymmetrical such that the gate of the second PMOS transistor obtains the power supply earlier than the gate of the fourth PMOS transistor does;

wherein the passed power supply shuts down the start-up circuit after the start-up phase such that an output of the start-up circuit is electrically disconnected from the bandgap circuit that generates a fixed reference voltage.

2. The control circuit according to claim 1, further comprising means for shaping waveform of the passed power supply.

3. The control circuit according to claim 2, wherein the shaping means comprises cascaded inverters each having serial-connected PMOS and NMOS.

4. A circuit for starting up a bandgap circuit, comprising:

a start-up circuit configured to induce current flow in the bandgap circuit during a start-up phase; and a control circuit comprising a comparator configured to pass a power supply to the start-up circuit according to an internal node of the bandgap circuit after the start-up phase, the comparator comprising:

a first PMOS transistor having a gate connected to a first node of the bandgap circuit, and a source connected to a positive power supply;

a first branch including serial-connected second PMOS transistor and third NMOS transistor, wherein a source of the second PMOS transistor is connected to a drain of the first PMOS transistor, and a source of the third NMOS transistor is connected to a base power supply; and a second branch including serial-connected fourth PMOS transistor and fifth NMOS transistor, wherein a source of the fourth PMOS transistor is connected to the drain of the first PMOS transistor, and a source of the fifth NMOS transistor is connected to the base power supply;

wherein a gate of the third NMOS transistor is connected to a drain of the fifth NMOS transistor, and a gate of the fifth NMOS transistor is connected to a drain, of the third NMOS transistor; and an activating circuit for activating the comparator to obtain the power supply at an output earlier than another output node of the comparator, the activating circuit comprising:

serial-connected sixth PMOS transistor and seventh NMOS transistor, an interconnected node between the sixth PMOS transistor and the seventh NMOS transistor being connected to a gate of the second PMOS transistor, wherein a gate of the sixth PMOS transistor is connected to the first node of the bandgap circuit, and a gate of the seventh NMOS transistor is connected to a second node of the bandgap circuit; and serial-connected eighth PMOS transistor and ninth NMOS transistor, an interconnected node between the eighth PMOS transistor and the ninth NMOS transistor being connected to a gate of the fourth PMOS transistor, wherein a gate of the eighth PMOS transistor is connected to the first node of the bandgap circuit, and a gate of the ninth NMOS transistor is connected to the second node of the bandgap circuit;

wherein the first node of the bandgap circuit reaches a specified low-level voltage and the second node of the bandgap circuit reaches a specified high-level voltage higher than the low-level voltage after the start-up phase; and wherein the seventh NMOS transistor and the ninth NMOS transistor are asymmetrical such that the gate of the second PMOS transistor obtains the power supply earlier than the gate of the fourth PMOS transistor does;

wherein the passed power supply shuts down the start-up circuit after the start-up phase such that an output of the start-up circuit is electrically disconnected from the bandgap circuit that generates a fixed reference voltage.

5. The circuit for starting up the bandgap circuit according to claim 4, further comprising means for shaping waveform of the passed power supply.

6. The circuit for starting up the bandgap circuit according to claim 5, wherein the shaping means comprises cascaded inverters each having serial-connected PMOS and NMOS.

7. The circuit for starting up the bandgap circuit according to claim 4, wherein the start-up circuit comprises:

a resistive load connected to the power supply at one end;

a first MOS with a gate receiving the passed power supply from the control circuit; and at least one second MOS with a gate connected to one of the source/drain of the first MOS, and connected to other end of the resistive load, wherein the second MOS induces current flow in the bandgap circuit during the start-up phase, and are close under control of the first MOS after the start-up phase.

8. The circuit for starting up the band gap circuit according to claim 7, wherein the resistive load comprises serial-connected PMOSs with their gates connected together and biased by a base power supply.

9. A source driver for a liquid crystal display, comprising:
a power circuit comprising:
a bandgap circuit for generating a reference signal;
a source for generating voltage or current according to the reference signal of the bandgap circuit;
a start-up circuit configured to induce current flow in the bandgap circuit during a start-up phase; and
a control circuit comprising:
a comparator configured to pass a power supply to the start-up circuit according to an internal node of the bandgap circuit after the start-up phase, the comparator comprising:
a first PMOS transistor having a gate connected to a first node of the bandgap circuit, and a source connected to a positive power supply;
a first branch including serial-connected second PMOS transistor and third NMOS transistor, wherein, a source of the second PMOS transistor is connected to a drain of the first PMOS transistor, and a source of the third NMOS transistor is connected to a base power supply; and
a second branch including serial-connected fourth PMOS transistor and fifth NMOS transistor, wherein a source of the fourth PMOS transistor is connected to the drain of the first PMOS transistor, and a source of the fifth NMOS transistor is connected to the base power supply;
wherein, a gate of the third NMOS transistor is connected to a drain of the fifth NMOS transistor, and a gate of the fifth NMOS transistor is connected to a drain of the third NMOS transistor; and
an activating circuit for activating the comparator to obtain the power supply at an output earlier than another output node of the comparator, the activating circuit comprising:
serial-connected sixth PMOS transistor and seventh NMOS transistor, an interconnected node between the sixth PMOS transistor and the seventh NMOS transistor being connected to a gate of the second PMOS transistor, wherein a gate of the sixth PMOS transistor is connected to the first node of the bandgap circuit, and a gate of the seventh NMOS transistor is connected to a second node of the bandgap circuit; and
serial-connected eighth PMOS transistor and ninth NMOS transistor, an interconnected node between the eighth PMOS transistor and the ninth NMOS transistor being connected to a gate of the fourth PMOS transistor, wherein a gate of the eighth PMOS transistor is connected to the first node of the bandgap circuit, and a gate of the ninth NMOS transistor is connected to the second node of the bandgap circuit;
wherein the first node of the bandgap circuit reaches a specified low-level voltage and the second node of the bandgap circuit reaches a specified high-level voltage higher than the low-level voltage after the start-up phase; and
wherein the seventh NMOS transistor and the ninth NMOS transistor are asymmetrical such that the gate of the second PMOS transistor obtains the power supply earlier than the gate of the fourth PMOS transistor does;
wherein, the passed power supply shuts down the start-up circuit after the start-up phase such that an output of the start-up circuit is electrically disconnected from the bandgap circuit.

10. The source driver according to claim 9, wherein the bandgap circuit comprises;
a first diode-connected PMOS;
a second PMOS;
a first NMOS electrically coupled to the first diode-connected PMOS in serial;
a second diode-connected NMOS electrically coupled to the second PMOS in serial;
a first diode-connected transistor connected to source of the second diode-connected NMOS; and
a resistor and a second diode-connected transistor connected in serial, and connected to source of the first NMOS;
wherein, gate of the first diode-connected PMOS and gate of the second PMOS are connected at a first node, and gate of the first NMOS and gate of the second diode-connected NMOS are connected at a second node.

11. The source driver according to claim 9, wherein the source comprises a mirror circuit that mirrors reference current in the bandgap circuit in order to supply at least one output current.

12. The source driver according to claim 9, further comprising means for shaping waveform of the passed power supply.

13. The source driver according to claim 12, wherein the shaping means comprises cascaded inverters each having serial-connected PMOS and NMOS.

14. The source driver according to claim 9, wherein the start-up circuit comprises:
a resistive load connected to the power supply at one end;
a first MOS with a gate receiving the passed power supply from the control circuit; and
at least one second MOS with a gate connected to one of the source/drain of the first MOS, and connected to other end of the resistive load, wherein the second MOS induces current flow in the bandgap circuit during the start-up phase, and are close under control of the first MOS after the start-up phase.

* * * * *